(12) United States Patent　　(10) Patent No.: US 9,074,102 B2
Chung　　(45) Date of Patent: Jul. 7, 2015

(54) COLD TRANSFER PRINTING PASTE, PRINTING COLORANT THEREOF, AND PREPARATION METHOD THEREOF

(75) Inventor: Po-Wen Chung, Shanghai (CN)

(73) Assignee: Newtech Textile Technology Development(Shanghai) Co., Ltd, Shanghai (CN)

( * ) Notice: Subject to any disclaimer, the term of this patent is extended or adjusted under 35 U.S.C. 154(b) by 88 days.

(21) Appl. No.: 13/811,256

(22) PCT Filed: Jul. 15, 2011

(86) PCT No.: PCT/CN2011/077200
§ 371 (c)(1),
(2), (4) Date: Jan. 18, 2013

(87) PCT Pub. No.: WO2012/010070
PCT Pub. Date: Jan. 26, 2012

(65) Prior Publication Data
US 2013/0118376 A1　May 16, 2013

(30) Foreign Application Priority Data
Jul. 19, 2010　(CN) .......................... 2010 1 0229867

(51) Int. Cl.
C09D 11/02　(2014.01)
C09D 5/00　(2006.01)
C09D 11/08　(2006.01)
D06P 1/38　(2006.01)
D06P 1/48　(2006.01)
D06P 1/647　(2006.01)
(Continued)

(52) U.S. Cl.
CPC C09D 5/00 (2013.01); C09D 11/02 (2013.01); C09D 11/08 (2013.01); D06P 1/38 (2013.01); D06P 1/48 (2013.01); D06P 1/647 (2013.01); D06P 5/007 (2013.01); D06P 1/44 (2013.01)

(58) Field of Classification Search
CPC .......... C09D 11/02; C09D 11/08; C09D 5/00; D06P 1/38; D06P 1/44; D06P 1/647; D06P 5/007
USPC ............. 106/31.94, 31.38, 31.39, 31.7, 31.71
See application file for complete search history.

(56) References Cited

U.S. PATENT DOCUMENTS 5,153,317 A　10/1992　Ortega et al.
5,958,547 A *　9/1999　Fukunishi et al. ........... 428/32.1
6,136,046 A *　10/2000　Fukunishi et al. ................. 8/552

FOREIGN PATENT DOCUMENTS

CN　1050419 A　4/1991
CN　1072976 A　6/1993
(Continued)

*Primary Examiner* — Veronica F Faison
(74) *Attorney, Agent, or Firm* — Muncy, Geissler, Olds & Lowe, P.C.

(57) ABSTRACT

The present invention relates to a cold transfer printing paste, a printing colorant and preparation methods thereof. Specifically, the present invention relates to: a cold transfer printing past, which contains polysaccharide, sodium L-pyrrolidonecarboxylate, an etherified starch and water; a printing colorant, which contains the paste of the present invention, an active dye, a defoamer, a flatting agent, a pH stabilizing agent and water; and preparation methods of the paste and the printing colorant. The cold transfer printing paste of the present invention and a printing colorant containing the paste are applicable in a cold transfer printing process, and have stable physical properties, thereby preventing decrease of the viscosity in use.

13 Claims, 2 Drawing Sheets

(51) Int. Cl.
*D06P 5/24* (2006.01)
*D06P 1/44* (2006.01)

(56) References Cited

FOREIGN PATENT DOCUMENTS

| CN | 1095120 A | 11/1994 |
| CN | 1116670 A | 2/1996 |
| CN | 1436891 A | 8/2003 |
| CN | 1469004 A | 1/2004 |
| CN | 1563558 A | 1/2005 |
| CN | 1600983 A | 3/2005 |
| CN | 1844558 A | 10/2006 |
| CN | 1922357 A | 2/2007 |
| CN | 1939946 A | 4/2007 |
| CN | 101314920 A | 12/2008 |

* cited by examiner

COLD TRANSFER PRINTING PASTE, PRINTING COLORANT THEREOF, AND PREPARATION METHOD THEREOF

BACKGROUND OF THE INVENTION

1. Technical Field

The present invention relates to the printing and dyeing industry in the textile industry, and more particularly relates to a printing paste containing polysaccharide, sodium L-pyrrolidonecarboxylate and an etherified starch, a printing colorant containing the printing paste, and preparation methods of the printing paste and the printing colorant.

2. Related Art

In recent years, the principal component of a printing paste mainly contains, for example, starch, modified starch and sodium alginate. For example, the principal component of printing pastes disclosed in CN101314920A (Chinese Patent Application No. CN200810047683.0, publication date: Dec. 3, 2008, Composite printing paste for active dry and preparation method thereof), and CN1563558A (Chinese Patent Application No. 200410014343.X, publication date: Jan. 12, 2005, Composite denatured starch printing paste with adjustable viscosity, and preparation method and application thereof), is modified starch. The principal component of printing pastes disclosed in CN1600983A (Chinese Patent Application No. 03151285.2, publication date: Mar. 30, 2005, Printing paste and preparation method thereof), and CN1436891A (Chinese Patent Application No. 02110072.1, publication date: Aug. 20, 2003, Active dye printing paste and preparation method thereof), is formed by combining a carboxymethyl starch and sodium alginate. Although starch, dyes and printing and dyeing chemicals have good stability, the application of starch in printing is restricted due to poor rheological properties. However, when sodium alginate meets calcium ions or other metal ions in hard water, calcium alginate or alginates of other metals are generated and precipitated, and due to thus precipitates, carboxyl ions losses charges. Therefore, a secondary alcohol group=CHOH in sodium alginate paste may react with the dye, which not only damages the colorant performance, but also causes chromatic aberration due to unstable coloring, as well as influence the color fastness; moreover, sodium alginate is expensive, so the cost of the paste is high.

Consequently, people continue to develop printing pastes that do not use starch and sodium alginate as the principal component, for example, inorganic printing paste with montmorillonite powder or rectorite clay as the principal component (see CN1095120A (Chinese Patent Application No. 93105604.7, publication date: Nov. 16, 1994, Inorganic printing paste and production method), and CN1072976A (Chinese Patent Application No. 92101281.0, publication date: Jun. 9, 1993, Preparation and application of rectorite clay printing paste)); printing pastes with guar gum or xanthan gum as the main raw material (see CN1844558A (Chinese Patent Application No. 200610038915.7, publication date: Oct. 11, 2006, Guar gum silk printing paste and preparation method thereof), and CN1116670A (Chinese Patent Application No. 94110684.5, publication date: Feb. 14, 1996, Printing paste and production method thereof); and printing pastes with a galactomannan as the principal component (see CN1050419A (Chinese Patent Application No. 89107422.8, publication date: Apr. 3, 1991, Sesbania seed gum printing paste and preparation process thereof), and CN1922357A (Chinese Patent Application No. 200580005243.3, publication date: Feb. 28, 2007, Thickening agent for textile printing paste). However, theses paste are applicable in direct printing processes such as a rotary screen printing process and a flat screen printing process, but not applicable in cold transfer printing process.

In cold transfer printing, first a suitable printing colorant containing a paste and a dye is printing on a paper, to form a transfer printing paper with desired patterns or letters; next, a surface of the transfer printing paper with the dye is tightly combined with a fabric to be printed, and then the dyes is removed or peeled off from the paper by means of a pressure, and the patterns or letters on the transfer printing paper is transferred onto the fabric. CN1939946A (Chinese Patent Application No. 200610116181.X, publication date: Apr. 4, 2007, Production method of modified paste and printing colorant), discloses a cold transfer printing paste synthesized by polymerization of starch, vinyl acetate and acrylic acid, but the rheological property of the modified starch formed through graft copolymerization is poor, and the colorant prepared by the paste is sensitive to shear force, so that the viscosity of the colorant is lost when being continuously printed on a transfer paper surface at a high speed and during the transfer printing process, which influences the quality of printing.

Therefore, there is a need for a novel paste for cold transfer printing and printing colorant containing the paste that can overcome one or more disadvantages of the paste or colorants in the prior art.

SUMMARY

The present invention is directed to a novel paste and colorant for cold transfer printing.

The inventor of the present invention accidentally finds that, a paste obtained by combining polysaccharide, sodium L-pyrrolidonecarboxylate and an etherified starch as the principal component and a printing colorant formulated by the paste have one or more of the following advantages: good rheological properties, good printing characteristics, good washing and coating performance, uniform dispersion of components, being stable (for example, being stable to metal ions), low cost, stable quality of printing and high color fastness. The present invention is developed based on the findings.

In a first aspect of the present invention, a paste for cold transfer printing is provided, which contains polysaccharide, sodium L-pyrrolidonecarboxylate, an etherified starch and water.

In an implementation of the first aspect of the present invention, the polysaccharide is xanthan gum, guar gum or a mixture thereof.

In another implementation of the first aspect of the present invention, the polysaccharide is 0.5 wt % to 4 wt % based on the total weight of the paste. In a specific implementation, the polysaccharide is 0.5 wt % to 3.5 wt %, 0.5 wt % to 3 wt %, 0.5 wt % to 2.5 wt %, 0.5 wt % to 2 wt %, 1 wt % to 4 wt %, 1.5 wt % to 4 wt %, 2 wt % to 4 wt %, 1 wt % to 3.5 wt %, 1 wt % to 3 wt %, 1 wt % to 2.5 wt % or 1 wt % to 2 wt %, based on the total weight of the paste.

In another implementation of the first aspect of the present invention, the sodium L-pyrrolidonecarboxylate is 0.4 wt % to 3 wt % based on the total weight of the paste. In a specific implementation, the sodium L-pyrrolidonecarboxylate is 0.4 wt % to 2.5 wt %, 0.4 wt % to 2 wt %, 0.5 wt % to 3 wt %, 1 wt % to 3 wt %, 0.5 wt % to 2.5 wt %, 0.5 wt % to 2 wt %, 1 wt % to 2.5 wt % or 1 wt % to 2 wt %, based on the total weight of the paste.

In another implementation of the first aspect of the present invention, the etherified starch is a low-viscosity etherified starch, of which the efflux time is 30 s or less detected by using a Zahn cup #2 at 25° C.

In another implementation of the first aspect of the present invention, the etherified starch is 20 wt % to 45 wt % based on the total weight of the paste. In a specific implementation, the etherified starch is 20 wt % to 40 wt %, 20 wt % to 35 wt %, 20 wt % to 30 wt %, 25 wt % to 45 wt %, 30 wt % to 45 wt %, 35 wt % to 45 wt %, 22 wt % to 40 wt %, 22 wt % to 35 wt %, 25 wt % to 35 wt % or 25 wt % to 30 wt %, based on the total weight of the paste.

In another implementation of the first aspect of the present invention, the water is distilled water, double distilled water, re-distilled water or deionized water.

In another implementation of the first aspect of the present invention, the paste contains:

| | |
|---|---|
| polysaccharide | 0.5 wt % to 4 wt %, |
| sodium L-pyrrolidonecarboxylate | 0.4 wt % to 3 wt %, |
| an etherified starch | 20 wt % to 45 wt %, and |
| water | added to 100 wt %. |

In another implementation of the first aspect of the present invention, the paste contains:

| | |
|---|---|
| polysaccharide | 1 wt % to 2 wt %, |
| sodium L-pyrrolidonecarboxylate | 0.5 wt % to 2 wt %, |
| an etherified starch | 25 wt % to 30 wt %, and |
| water | added to 100 wt %. |

In a second aspect of the present invention, a preparation method of the paste of the first aspect of the present invention is provided, which includes the following steps:

a) in a mixer, at a temperature of 65° C. to 70° C. (for example, about 70° C.), and at 1400 to 2800 r/min, stirring a mixture of a formula amount of polysaccharide and a suitable amount of water for 1 to 5 hrs (for example, about 2 hrs), b) slowly adding a formula amount of sodium L-pyrrolidonecarboxylate with stirring, and mixing uniformly, to obtain a colloid pre-paste for use;

c) stirring a mixture of a formula amount of an etherified starch and a suitable amount of water in a reactor, and heating with stirring to raise the temperature of the mixture, after the temperature is raised to 80° C. to 90° C. (for example, about 85° C.), stopping heating, and stirring at a rotation rate of 1200 to 1600 r/min (for example, about 1400 r/min), for 1 to 5 hrs (for example, about 2 hrs), to obtain a light gray transparent starch pre-paste for use; and d) mixing the colloid pre-paste obtained in Step b), and the starch pre-paste obtained in Step c), adding water to a certain volume, and stirring uniformly at 10° C. to 35° C. (fore example, about room temperature). The finally product obtained through the above steps is the cold transfer printing paste.

In an implementation of the second aspect of the present invention, the raw materials each independently have the characteristics described in the first aspect of the present invention.

In a third aspect of the present invention, a printing colorant is provided, which includes the paste of the first aspect of the present invention, an active dye, a defoamer, a flatting agent, a pH stabilizer and water.

In an implementation of the third aspect of the present invention, the paste is as described in any implementation of the first aspect of the present invention. In different implementations of the third aspect of the present invention, the paste of the first aspect of the present invention is each independently combined with other components in the printing colorant.

In another implementation of the third aspect of the present invention, the paste is 20 wt % to 30 wt % based on the total weight of the printing colorant. In a specific implementation, the paste is 20 wt % to 25 wt %, 20 to 26 wt %, 20 wt % to 25 wt %, 22 wt % to 30 wt %, 24 wt % to 30 wt %, 25 wt % to 30 wt %, 21 wt % to 29 wt %, 22 wt % to 28 wt %, 23 wt % to 27 wt % or 24 wt % to 26 wt %, based on the total weight of the printing colorant.

In another implementation of the third aspect of the present invention, the active dye may be conventionally used dye in the art. In a specific implementation, the active dye is selected from KN type active dyes, M type active dyes, Dystar Remazol series dyes, P type active dyes (such as products of Huntsman International LLC.) and so on.

In another implementation of the third aspect of the present invention, the active dye is 15 wt % to 35 wt % based on the total weight of the printing colorant. In a specific implementation, the active dye is 15 wt % to 32 wt %, 15 wt % to 30 wt %, 15 wt % to 28 wt %, 15 wt % to 25 wt %, 18 wt % to 35 wt %, 20 wt % to 35 wt %, 22 wt % to 35 wt %, 25 wt % to 35 wt %, 18 wt % to 30 wt %, 18 wt % to 28 wt % or 20 wt % to 25 wt %, based on the total weight of the printing colorant.

In another implementation of the third aspect of the present invention, the defoamer may be a conventionally used defoamer in the art. In a specific implementation, the defoamer is selected from tributyl phosphate, polyorganosiloxane, polyester modified siloxane or a combination thereof.

In another implementation of the third aspect of the present invention, the defoamer is 0.3 wt % to 0.5 wt % based on the total weight of the printing colorant. In a specific implementation, the defoamer is 0.3 wt % to 0.48 wt %, 0.3 wt % to 0.45 wt %, 0.3 wt % to 0.42 wt %, 0.3 wt % to 0.4 wt %, 0.32 wt % to 0.5 wt %, 0.35 wt % to 0.5 wt %, 0.38 wt % to 0.5 wt % or 0.4 wt % to 0.5 wt %, based on the total weight of the printing colorant.

In another implementation of the third aspect of the present invention, the flatting agent may be conventionally used flatting agent in the art. In a specific implementation, the flatting agent is selected from polyether modified polydimethyl siloxane, polyether modified methyl alkyl polysiloxane or a combination thereof.

In another implementation of the third aspect of the present invention, the flatting agent is 0.2 wt % to 0.6 wt % based on the total weight of the printing colorant. In a specific implementation, the flatting agent is 0.2 wt % to 0.55 wt %, 0.2 wt % to 0.5 wt %, 0.2 wt % to 0.45 wt %, 0.25 wt % to 0.6 wt %, 0.3 wt % to 0.6 wt %, 0.35 wt % to 0.6 wt %, 0.4 wt % to 0.6 wt %, 0.25 wt % to 0.55 wt % or 0.3 wt % to 0.5 wt %, based on the total weight of the printing colorant.

In another implementation of the third aspect of the present invention, the pH stabilizer may be a conventionally used pH stabilizer in the art. In a specific implementation, the pH stabilizer is selected from sodium dihydrogen phosphate, disodium hydrogen phosphate or a combination thereof.

In another implementation of the third aspect of the present invention, the pH stabilizer is 0.5 wt % to 1.5 wt % based on the total weight of the printing colorant. In a specific implementation, the pH stabilizer is 0.5 wt % to 1.25 wt %, 0.5 wt % to 1.0 wt %, 0.55 wt % to 1.5 wt %, 0.6 wt % to 1.5 wt %, 0.55 wt % to 1.25 wt % or 0.6 wt % to 1.0 wt %, based on the total weight of the printing colorant.

In another implementation of the third aspect of the present invention, the water is distilled water, double distilled water, re-distilled water or deionized water.

In another implementation of the third aspect of the present invention, the printing colorant contains:

| | |
|---|---|
| the paste of the first aspect of the present invention | 20 wt % to 30 wt %, |
| an active dye | 15 wt % to 35 wt %, |
| a defoamer | 0.3 wt % to 0.5 wt %, |
| a flatting agent | 0.2 wt % to 0.6 wt %, |
| a pH stabilizer | 0.5 wt % to 1.5 wt %, and |
| water | added to 100 wt %. |

In another implementation of the third aspect of the present invention, the printing colorant contains:

| | |
|---|---|
| the paste of the first aspect of the present invention | 24 wt % to 26 wt %, |
| an active dye | 20 wt % to 25 wt %, |
| a defoamer | 0.3 wt % to 0.4 wt %, |
| a flatting agent | 0.3 wt % to 0.5 wt %, |
| a pH stabilizer | 0.6 wt % to 1.0 wt %, and |
| water | added to 100 wt %. |

The printing colorant of the third aspect of the present invention further contains a solvent for dissolving the active dye. In an implementation, the solvent for dissolving the active dye is ethylene glycol monobutyl ether. In an implementation, the amount of the solvent for dissolving the active dye can be easily determined by persons of ordinary skill in the art based on the existing knowledge and/or experience. In an implementation, the solvent for dissolving the active dye, the amount of the solvent is a minimum amount required for dissolving the active dye.

The printing colorant of the third aspect of the present invention further contains a viscosity modifier (for example, ethylene glycol), and/or surface tension modifier (for example, diethylene glycol). In an implementation, the viscosity modifier may be not limited and, for example, adjust the viscosity of the material to 1000 to 1300 centipoise at 25° C. In an implementation, the surface tension modifier may be not limited and, for example, adjust the surface tension of the material to ≥40 dyne.

In a fourth aspect of the present invention, a preparation method of the printing colorant of the third aspect of the present invention is provided, which includes the following steps:

i) pre-dissolving a dye in water, and added a solvent (for example, ethylene glycol monobutyl ether), till the dye is completely dissolved;

ii) to the solution obtained in Step i), adding the paste of the first aspect of the present invention, a flatting agent, a defoamer and a pH stabilizer, and stirring uniformly (for example, for 45 to 60 min at a stirring speed of 1200 to 1480 r/min);

iii) to the material obtained in Step ii), adding a viscosity modifier (for example, ethylene glycol), to adjust the viscosity to 1000 to 1300 centipoise at 25° C., to obtain a crude colorant; and iv) grinding the crude colorant (for example, in a ball mill for 2 hrs), to a particle diameter, to enable the colorant to pass through a 200-mesh sieve; and then adjusting the surface tension to ≥40 dyne by using a surface tension modifier (for example, diethylene glycol), to obtain a printing colorant.

In a fifth aspect of the present invention, a cold transfer printing method is provided, which includes a step of using the paste of any implementation of the first aspect of the present invention and the printing colorant of any implementation of the third aspect of the present invention.

The aspects of the present invention and features thereof are further described below.

All the references cited in the present invention are incorporated herein by reference in their entire, and when the meaning expressed by the references is not consistent with that expressed by the present invention, the expression in the present invention is taken as a criterion. In addition, unless otherwise defined herein, the various terms and phrases used in the present invention have the common meaning known to persons of ordinary skill in the art, and if the meaning of terms and phrases defined herein is not consistent with the known meaning, the expression in the present invention is taken as a criterion.

The term "paste for cold transfer printing" in the present invention (also referred to as "cold transfer printing paste"), refers to a paste involved in printing and dyeing industry, and is applicable in a cold transfer printing production process. Similarly, the term "printing colorant" (also referred to as "colorant for printing"), refers to a slurry containing a dye involved in the printing and dyeing industry, and is applicable in a printing production process, especially a cold transfer printing production process.

The term "polysaccharide" in the present invention refers to a type of large carbohydrate substances having a complex molecular structure formed by a plurality of monosaccharide molecules through a condensation reaction with the loss of water. All the carbohydrate compounds meeting the polymer compound concept and derivatives thereof belong to polysaccharides. The commonly used polysaccharide includes starch; glycogen; cellulose structure; chitin (chitosan): a straight chain formed by N-acyl-D-glucosamine connected with (1,4)glycosidic linkages; synanthrin: a polyfructose, existing in compositae roots; and agar. Preferably, the polysaccharide useful in the present invention mainly includes xanthan gum and guar gum.

The term "etherified starch" in the present invention (also referred to as starch ether), is a starch replaced ether formed by a reaction of the hydroxyl group in the starch molecule and a reactive substance. Preferably, the etherified starch useful in the present invention is a low-viscosity etherified starch, namely, an etherified starch of which the efflux time is 30 s or less detected by using a Zahn cup #2 at 25° C.

The unit symbol "wt %" in the present invention refers to a percentage calculated by weight.

The term "flatting agent" in the present invention refers to a commonly used printing and dyeing additive, which enables a colorant to form a flat, smooth and uniform film in the drying and film forming process.

The term "pH stabilizer" in the present invention refers to a pH buffer, which can impede changes of the pH value of a solution, so that the pH value of the system is stable in a certain range.

In an implementation of the present invention, a cold transfer printing paste is provided, which is prepared by polysaccharide, sodium L-pyrrolidonecarboxylate, an etherified starch and distilled water.

In an implementation, the weight percentages of the components of the cold transfer printing paste are as follows:

| | |
|---|---|
| polysaccharide | 0.5% to 4%, |
| sodium L-pyrrolidonecarboxylate | 0.4% to 3%, |
| an etherified starch | 20% to 45%, and |
| distilled water | added to 100%. |

In an implementation, the polysaccharide is xanthan gum or guar gum.

In an implementation of the present invention, a preparation method of a cold transfer printing paste, which includes the following steps:

A) in distilled water, placing polysaccharide of 0.5% to 4% of the total weight of a cold transfer printing paste in a mixer, stirring for 2 hrs at a temperature of 70° C. and at 1400 to 2800 r/min, slowly adding sodium L-pyrrolidonecarboxylate of 0.4% to 3% of the total weight of a cold transfer printing paste with stirring, and mixing uniformly, to obtain a colloid pre-paste for use;

B) in distilled water, placing a low-viscosity etherified starch of 20% to 45% of the total weight of a cold transfer printing paste in a reactor, heating with stirring at a slow speed, after the temperature is raised to 850° C., stopping heating, and stirring the resulting product for 2 hrs at a rotation speed of 1400 r/min, to obtain a starch pre-paste for use, where the whole paste is light gray and transparent; and C) mixing the colloid pre-paste with the starch pre-paste, adding distilled water to 100%, and stirring uniformly at room temperature, to obtain a cold transfer printing paste.

In an implementation, xanthan gum, guar gum and sodium L-pyrrolidonecarboxylate are industrial grade. In an implementation, the starch is an industrial grade low-viscosity etherified starch, of which the efflux time is 30 s or less detected by a Zahn cup #2 at 25° C.

In another implementation of the present invention, a printing colorant containing the cold transfer printing paste of the present invention is provided.

In a specific implementation, the components of the printing colorant are:

| | |
|---|---|
| the cold transfer printing paste | 20% to 30%, |
| an active dye | 15% to 35%, |
| a defoamer | 0.3% to 0.5%, |
| a flatting agent | 0.2% to 0.6%, |
| a pH stabilizer | 0.5% to 1.5%, and |
| deionized water | added to 100%. |

In an implementation of the present invention, a preparation method of a printing colorant is provided, which includes the following steps: in deionized water, pre-dissolving a dye, and adding ethylene glycol monobutyl ether till the dye is completely dissolved; next, adding the cold transfer printing paste, a flatting agent, a defoamer and a pH stabilizer and stirring for 45 to 60 min at a stirring speed of 1200 to 1480 r/min; adding ethylene glycol to adjust the viscosity of the colorant to 1000 to 1300 centipoise at 25° C., to obtain a crude colorant; grinding the resulting crude colorant for about 2 hrs in a ball mill to a particle diameter, to enable the colorant to pass through a 200-mesh sieve, and then adjusting the surface tension to ≥40 dyne by using diethylene glycol, to obtain the printing colorant.

In an implementation, the active dye is a KN type active dye or an M type active dye (made in China); or a Dystar Remazol series dye; or a P type active dye (manufactured by Huntsman International LLC.).

In an implementation, the xanthan gum useful in the present invention is industrial grade, and is a type of natural polysaccharide and important biopolymer, and is produced by cabbage black rot Xanthomonas campestris pv. Campestris with carbohydrates as main raw materials by adopting an aerobic fermentation bioengineering technology.

In an implementation, the guar gum useful in the present invention is industrial grade, and is a macromolecular natural hydrophilic colloid, and is mainly formed by polymerization of galactose and mannose and belongs to natural galactomannans.

In an implementation, sodium L-pyrrolidonecarboxylate useful in the present invention is industrial grade. L-pyrrolidone carboxylic acid (PCA) is one of the decomposition products of filamentous assembly protein. Sodium L-pyrrolidonecarboxylate is a sodium salt of PCA, has a chemical name of sodium 2-pyrrolidone-5-carboxylate (PCA-Na), is generated from sodium L-glutamate through heating cyclization or in the presence of microorganisms, and is a biomimetic compound.

In an implementation, the low-viscosity etherified starch useful in the present invention is industrial grade, has strong stability, is not easily aged, and will not be hydrolyzed and precipitated; and has a strong adhesion and a good permeability, is not easily decoated, and has good film-forming properties.

The cold printing paste and the printing colorant of the present invention have many advantages, and are suitable for a cold transfer printing production process. The cold transfer printing paste has stable physical properties, and the formulated printing colorant has good printing performance and transfer performance. The viscosity of the paste will not be reduced in use, and the pasted can be removed by washing the textile after transfer printing with an extremely small amount of water. During cold print-batch fixation, the dye is fixed into the fiber without influences, the printed patterns are fine, the quality is excellent, and the cost is low.

BRIEF DESCRIPTION OF THE DRAWINGS

The present invention will become more fully understood from the detailed description given herein below for illustration only, and thus not limitative of the present invention wherein.

DETAILED DESCRIPTION

The present invention is further described below with the following embodiments, but the scope of the present invention is not limited to the following embodiments. Persons skilled in the art can understand that, without departing from the spirit and scope of the present invention, various changes and modifications can be made to the present invention.

In the following embodiments, unless otherwise stated, the components are known in the art and are commercially available. In addition, unless otherwise stated, % represents, wt %, namely, weight percentage.

I Common Preparation Method of Cold Transfer Printing Paste

Herein, common preparation method of a cold transfer printing paste of the present invention is described with a preferable implementation and an exemplary implementation.

The weight percentages of components of the cold transfer printing paste are as follows:

| | |
|---|---|
| polysaccharide | 1% to 2%, |
| sodium L-pyrrolidonecarboxylate | 0.5% to 2%, |
| an etherified starch | 25% to 30%, and |
| distilled water | added to 100%. |

Polysaccharide is xanthan gum or guar gum.

Figure 1:
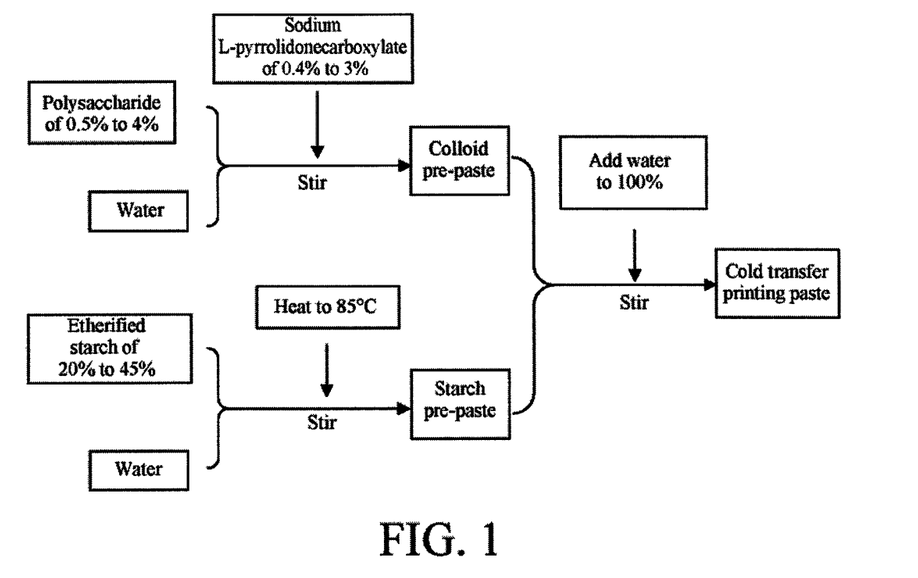
FIG. 1 is a flow chart of a process of formulating a cold transfer printing paste.

A common synthesis method of the cold transfer printing paste is as follows:

FIG. 1 shows a flow chart of a common process of formulating a cold transfer printing paste. Specifically, in distilled water, polysaccharide of 1% to 2% of the total weight of a cold transfer printing paste is placed in a mixer, and stirred for 2 hrs at a temperature 70° C. and 1400 to 2800 r/min, and sodium 2-pyrrolidone-5-carboxylate (PCA-Na), of 0.5% to 2% of the total weight of a cold transfer printing paste is slowly added with stirring, and mixed uniformly, to obtain a colloid pre-paste for use. In distilled water, a low-viscosity etherified starch (for example, a low-viscosity etherified starch manufactured by Shanghai Kangpai Biological Technology Co., Ltd.), of 25% to 30% of the total weight of a cold transfer printing paste is placed in a reactor, and heated with stirring at a low speed. After the temperature is raised to 85° C., heating is stopped, and the mixture is stirred for 2 hrs at a rotation speed of about 1400 r/min, to obtain the starch pre-paste, where the whole paste is light gray and transparent. The colloid pre-paste and the starch pre-paste are mixed at room temperature, and distilled water is added to 100%, and the mixture is stirred uniformly, to obtain a cold transfer printing paste.

Embodiment 1 Preparation of Cold Transfer Printing Paste

Formula components are:

| | |
|---|---|
| xanthan gum | 2%, |
| sodium L-pyrrolidonecarboxylate | 1%, |
| an etherified starch | 28%, and |
| distilled water | added to 100%. |

As for the preparation method, reference can be made to the flow chart of formulating a cold transfer printing paste shown in FIG. 1. Specifically, in distilled water, xanthan gum (commercially available), of 2% of the total weight of a cold transfer printing paste was placed in a mixer, and stirred for 2 hrs at a temperature of 70° C. and about 2500 r/min, and sodium L-pyrrolidonecarboxylate (PCA-Na) (commercially available) of 1% of the total weight of a cold transfer printing paste was added slowly with stirring, and mixed uniformly, to obtain a colloid pre-paste for use. In distilled water, a low-viscosity etherified starch of 28% of the total weight of a cold transfer printing paste was placed in a reactor, and heated with stirring at a low speed. After the temperature was raised to 85° C., heating was stopped, and the mixture was stirred for 2 hrs at a rotation speed of about 1400 r/min, to obtain a light gray transparent starch pre-paste. The colloid pre-paste and the starch pre-paste were mixed at room temperature, and distilled water was added to 100%, and the mixture was stirred uniformly, to obtain a cold transfer printing paste.

Embodiment 2 Preparation of Cold Transfer Printing Paste

Formula components are:

| | |
|---|---|
| xanthan gum | 0.5%, |
| sodium L-pyrrolidonecarboxylate | 0.4%, |
| an etherified starch | 45%, and |
| distilled water | added to 100%. |

As for the preparation method, reference can be made to the flow chart of a process of formulating a cold transfer printing paste shown in FIG. 1. Specifically, in distilled water, xanthan gum of 5% of the total weight of a cold transfer printing paste was placed in a mixer, and stirred for 2 hrs at a temperature of 70° C. and about 2700 r/min, and sodium L-pyrrolidonecarboxylate (PCA-Na), of 0.4% of the total weight of a cold transfer printing paste was added slowly with stirring, and mixed uniformly, to obtain a colloid pre-paste for use. In distilled water, a low-viscosity etherified starch (commercially available), of 45% of the total weight of a cold transfer printing paste was placed in a reactor, and heated with stirring at a low speed. After the temperature was raised to 85° C., heating was stopped, and the mixture was stirred for 2 hrs at a rotation speed of about 1400 r/min, to obtain a starch pre-paste, where the whole paste was light gray and transparent. The colloid pre-paste and the starch pre-paste were mixed at room temperature, and distilled water was added to 100%, and the mixture was stirred uniformly, to obtain a cold transfer printing paste.

Embodiment 3 Preparation of Cold Transfer Printing Paste

Formula components are:

| | |
|---|---|
| guar gum | 3.5%, |
| sodium L-pyrrolidonecarboxylate | 3%, |
| an etherified starch | 20%, |
| distilled water | added to 100%. |

As for the preparation method, reference can be made to the flow chart of a process of formulating a cold transfer printing paste shown in FIG. 1. Specifically, in distilled water, guar gum (commercially available), of 3.5% of the total weight of a cold transfer printing paste was placed in a mixer, and stirred for 2 hrs at a temperature of 70° C. and about 1400 r/min, sodium L-pyrrolidonecarboxylate (PCA-Na), of 3% of the total weight of a cold transfer printing paste was added slowly with stirring, and mixed uniformly, to obtain a colloid pre-paste for use. In distilled water, a low-viscosity etherified starch of 20% of the total weight of a cold transfer printing paste was placed in a reactor, and heated with stirring at a low speed. After the temperature was raised to 85° C., heating was stopped, and the mixture was stirred for 2 hrs at a rotation speed of about 1400 r/min, to obtain a starch pre-paste, where the whole paste was light gray and transparent. The colloid pre-paste and the starch pre-paste were mixed at room temperature, and distilled water was added to 100%, and the mixture was stirred uniformly, to obtain a cold transfer printing paste.

II Common Preparation Method of Printing Colorant

Herein, with a KN type active dye as an example, common preparation of a printing colorant of the present invention is described with a preferable implementation and an exemplary implementation.

The weight percentages of components of the printing colorant are as follows:

| | |
|---|---|
| a cold transfer printing paste | 24% to 26% (the cold transfer printing paste of Embodiment 1, 2 or 3), |
| an active dye | 20% to 25%, |
| a defoamer | 0.3% to 0.4%, |
| a flatting agent | 0.3% to 0.5%, |
| a pH stabilizer | 0.6% to 1.0%, and |
| deionized water | added to 100%. |

Figure 2:
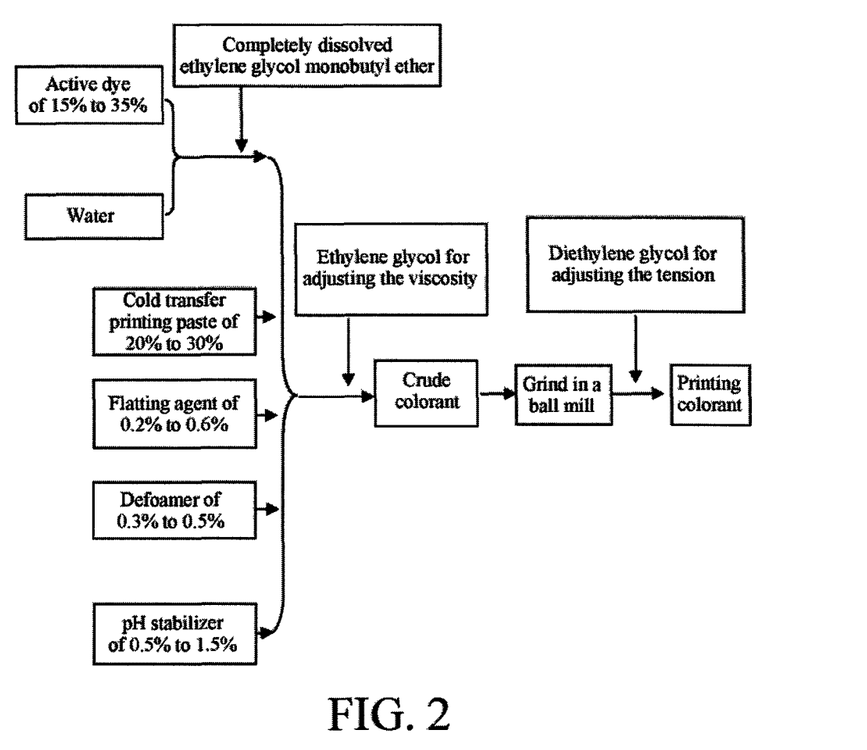
FIG. 2 is a flow chart of a process of formulating a printing colorant.

A common formulation method of the printing colorant is as follows:

FIG. 2 shows a flow chart of a common process of formulating a printing colorant. Specifically, in deionized water, an active dye of 20% to 25% is pre-dissolved, and a solvent ethylene glycol monobutyl ether is added till the dye is completely dissolved. Next, to the solution, a cold transfer printing paste of 24% to 26%, a flatting agent of 0.3% to 0.5%, a defoamer of 0.3% to 0.4% and a pH stabilizer of 0.6% to 1.0% are added and stirring for 45 to 60 min at a stirring speed of 1200 to 1480 r/min. Then, ethylene glycol is added to the mixture to adjust the viscosity of the colorant to 1000 to 1300 centipoise at 25° C., to obtain a crude colorant. The resulting colorant is ground to a particle diameter in a ball mill for about 2 hrs, so that the ground colorant can pass through a 200-mesh sieve, and then the surface tension is adjusted to ≥40 dyne with diethylene glycol, to obtain the printing colorant. The active dye used in this implementation is a KN type active dye, and may also be an M type active dye; and the cold transfer printing paste may be the cold transfer printing paste of any one of Embodiments 1 to 3.

Embodiment 4 Preparation of Printing Colorant

A KN type active dye is used to formulate a colorant, and as for the formulation process, reference can be made to the flow chart of a process of formulating a printing colorant shown in FIG. 2.

The KN type active dye printing colorant includes, by weight percentage:

| | |
|---|---|
| an active dye, KN type active dye (commercially available), | 24%, |
| a cold transfer printing paste | 25% (the cold transfer printing paste of any one of Embodiments 1 to 3), |
| a tributyl phosphate (commercially available), defoamer | 0.3%, |
| a polyether modified methyl alkyl polysiloxane flatting agent (commercially available), | 0.4%, |
| a pH stabilizer (a mixture of sodium dihydrogen phosphate and disodium hydrogen phosphate at a weight ratio of 1:1), | 0.8%, and |
| deionized water | added to 100%. |

As for the formulation method, reference can be made to the common formulation method of the printing colorant.

In this embodiment, the pastes of Embodiments 1 to 3 are respectively used to prepare a printing colorant, to obtain printing colorants marked as a printing colorant 41, a printing colorant 42 and a printing colorant 43.

Embodiment 5 Preparation of Printing Colorant

A Remazol type active dye is used to formulate a colorant, and as for the formulation process, reference can be made to the flow chart of a process of formulating a printing colorant shown in FIG. 2.

The Remazol type active dye printing colorant includes, by weight percentage:

| | |
|---|---|
| an active dye, Remazol type active dye (Dystar Company), | 29.9%, |
| a cold transfer printing paste | 30% (the cold transfer printing paste of any one of Embodiments 1 to 3), |
| a polyester modified siloxane defoamer (commercially available), | 0.3%, |
| a polyether modified polydimethyl siloxane (commercially available), flatting agent | 0.3%, |
| a pH stabilizer (a mixture of sodium dihydrogen phosphate and disodium hydrogen phosphate at a weight ratio of 1:1) | 0.5%, and |
| deionized water | added to 100%. |

As for the formulation method, reference can be made to the common formulation method of the printing colorant.

In this embodiment, the pastes of Embodiments 1 to 3 are respectively used to prepare a printing colorant, to obtain printing colorants marked as a printing colorant 51, a printing colorant 52, and a printing colorant 53.

Embodiment 6 Preparation of Printing Colorant

A P type active dye is used to formulate a colorant, and as for the formulation process, reference can be made to the flow chart of a process of formulating a printing colorant shown in FIG. 2.

The P type active dye printing colorant includes, by weight percentage:

| | |
|---|---|
| a P type active dye (manufactured by Huntsman International LLC.) | 16%, |
| a cold transfer printing paste | 22% (the cold transfer printing paste of any one of Embodiments 1 to 3), |
| a polyorganosiloxane defoamer (commercially available), | 0.4%, |
| a polyether modified methyl alkyl polysiloxane flatting agent | 0.4%, |
| a pH stabilizer (a mixture of sodium dihydrogen phosphate and disodium hydrogen phosphate at a weight ratio of 1:1), | 1%, and |
| deionized water | added to 100%. |

As for the formulation method, reference can be made to the common formulation method of the printing colorant.

In this embodiment, the pastes of Embodiments 1 to 3 are respectively used to prepare a printing colorant, to obtain printing colorants marked as a printing colorant 61, printing colorant 62, and a printing colorant 63.

III Tests of Performance of the Paste and the Printing Colorant of the Present Invention Test samples the paste of the present invention: the paste of Embodiments 1, 2, and 3; and the printing colorant of the present invention: the printing colorants 41, 42, 43, 51, 52, 53, 61, 62, and 63.

Test methods

According to the method in Patent CN200510026661.2 "Production process of printing whole cotton transfer printing paper by gravure printing machine", a transfer printing paper is produced by using the colorant, and transfer printing is performed by using Patent CN200620039111 "carpet tape transfer device of cold transfer printing machine".

Indexes

1. Transfer rate: Transfer rate (%)=amount of the dye transferred and printed/oringial amount of the dye on the printing paper (%);

2. Color fixation rate: Color fixation rate (%)=amount of the dye bonded with the fabric fiber after color fixation/amount of the dye on the surface of the fabric before color fixation;

3. Color fastness: referring to GB/T 3920-1997 Textile Color Fastness Test Color Fastness to Rubbing;

4. Printing pattern fineness evaluation: For the same pattern, visual comparison is performed for evaluation.

Test results: The test results are listed in Table 1.

TABLE 1

Comparison table of the quality of printing products using different colorants

| colorant | Transfer Rate | Color Fixation Rate | Color Fastness | Printing Pattern Fineness Evaluation |
|---|---|---|---|---|
| Colorant 41 | 96% | 90% | 88% | High fineness, no infiltration |
| Colorant 42 | 92% | 88% | 86% | High fineness, with pigment residue |
| Colorant 43 | 90% | 87% | 85% | High fineness, with infiltration (slight amount) |
| Colorant 51 | 90% | 86% | 85% | High fineness, no infiltration |
| Colorant 52 | 88% | 84% | 82% | Fineness, with white spots |
| Colorant 53 | 87% | 84% | 82% | Fineness, with pigment residue |
| Colorant 61 | 85% | 83% | 80% | Acceptable fineness, with white spots |
| Colorant 62 | 82% | 81% | 80% | Low fineness, with pigment residue |
| Colorant 63 | 82% | 80% | 80% | Acceptable fineness, with pigment residue |

Persons of ordinary skill in the art generally expect that the three parameters, namely, the transfer rate, the color fixation rate and the color fastness are respectively greater than 80%.

It can be seen from the results in Table 1 that the printing paste and the printing colorant of the present invention achieve good effect in one or more aspects of the transfer rate, the color fixation rate, the color fastness and the pattern fineness.

What is claimed is:

1. A paste, comprising polysaccharide, sodium L-pyrrolidonecarboxylate, etherified starch having an efflux time of 30 seconds or less at 25° C. and water, wherein the polysaccharide is xanthan gum, guar gum or a mixture thereof, the polysaccharide is 0.5 wt % to 4 wt % based on the total weight of the paste, the sodium L-pyrrolidonecarboxylate is 0.4 wt % to 3 wt % based on the total weight of the paste, and the etherifield starch is 20 wt % to 45 wt % based on the total weight of the paste.

2. The paste according to claim 1, comprising:

| polysaccharide | 1 wt % to 2 wt %, |
|---|---|
| sodium L-pyrrolidonecarboxylate | 0.5 wt % to 2 wt %, |
| etherified starch | 25 wt % to 30 wt %, and |
| water | added to 100 wt %. |

3. A preparation method of a paste according to claim 1, the paste comprising polysaccharide, sodium L-pyrrolidonecarboxylate, etherified starch having an efflux time of 30 seconds or less at 25° C. and water, the polysaccharide is xanthan gum, guar gum or a mixture therefore, the preparation method comprising:
   a) in a mixer, at a temperature of 65° C. to 70° C. and 1400 to 2800 r/min, stirring a mixture of a formula amount of polysaccharide and a suitable amount of water for 1 to 5 hrs;
   b) slowly adding a formula amount of sodium L-pyrrolidonecarboxylate with stirring, and mixing uniformly, to obtain a colloid pre-paste for use;
   c) stirring a mixture of a formula amount of an etherified starch and a suitable amount of water in a reactor, and heating with stirring to raise the temperature of the mixture, after the temperature is raised to 80° C. to 90° C., stopping heating, and stirring at a rotation rate of 1200 to 1600 r/min for 1 to 5 hrs, to obtain a light gray transparent starch pre-paste for use; and
   d) mixing the colloid pre-paste obtained in Step b) and the starch pre-paste obtained in Step c), adding water to a certain volume, and stirring uniformly at 10° C. to 35° C.

4. A printing colorant, comprising a paste, an active dye, a defoamer, a flatting agent, a pH stabilizer and water, the paste comprising polysaccharide, sodium L-pyrrolidonecarboxylate, etherified starch having an efflux time of 30 seconds or less at 25° C. and water, wherein the polysaccharide is xanthan gum, guar gum or a mixture thereof.

5. The printing colorant according to claim 4, wherein the active dye is selected from KN type active dyes, M type active dyes, Dystar Remazol series dyes, P type active dyes, or a combination thereof 6. The printing colorant according to claim 4, wherein the paste is 20 wt % to 30 wt % of the total weight of the printing colorant.

7. The printing colorant according to claim 5, wherein the paste is 20 wt % to 30 wt % of the total weight of the printing colorant.

8. The printing colorant according to claim 4, wherein the active dye is 15 wt % to 35 wt % of the total weight of the printing colorant.

9. The printing colorant according to claim 5, wherein the active dye is 15 wt % to 35 wt % of the total weight of the printing colorant.

10. The printing colorant according to claim 6, wherein the active dye is 15 wt % to 35 wt % of the total weight of the printing colorant.

11. The printing colorant according to claim 4, wherein the paste is 20 wt % to 30 wt % of the total weight of the printing colorant, the active dye is 15 wt % to 35wt % of the total weight of the printing colorant, the defoamer is 0.3 wt % to 0.5 wt % of the total weight of the printing colorant, the flatting agent is 0.2 wt % to 0.6 wt % of the total weight of the printing colorant, and the pH stabilizer is 0.5 wt % to 1.5 wt % of the total weight of the printing colorant.

12. The printing colorant according to claim 4, comprising:

| the paste | 24 wt % to 26 wt %, |
|---|---|
| an active dye | 20 wt % to 25 wt %, |
| a defoamer | 0.3 wt % to 0.4 wt %, |
| a flatting agent | 0.3 wt % to 0.5 wt %, |
| a pH stabilizer | 0.6 wt % to 1.0 wt %, and |
| water | added to 100 wt %. |

13. The preparation method of the printing colorant according to claim 4, comprising:
   i) pre-dissolving a dye in water, and adding a solvent till the dye is completely dissolved;
   ii) to the solution obtained in Step i), adding the paste and a flatting agent, a defoamer and a pH stabilizer, and stirring uniformly;
   iii) to the material obtained in Step ii), adding a viscosity modifier to adjust the viscosity to 1000 to 1300 centipoise at 25° C., to obtain a crude colorant; and
   iv) grinding the crude colorant to a particle diameter, to enable the colorant to pass through a 200-mesh sieve; and then adjusting the surface tension to ≥40 dyne by using a surface tension modifier, to obtain a printing colorant.

* * * * *